Oct. 18, 1960 R. DAUB 2,956,847
PISTON HEAD STRUCTURE
Original Filed June 14, 1954 4 Sheets-Sheet 1
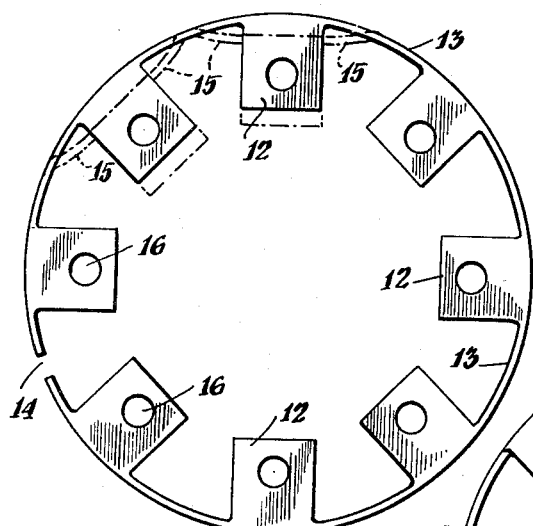
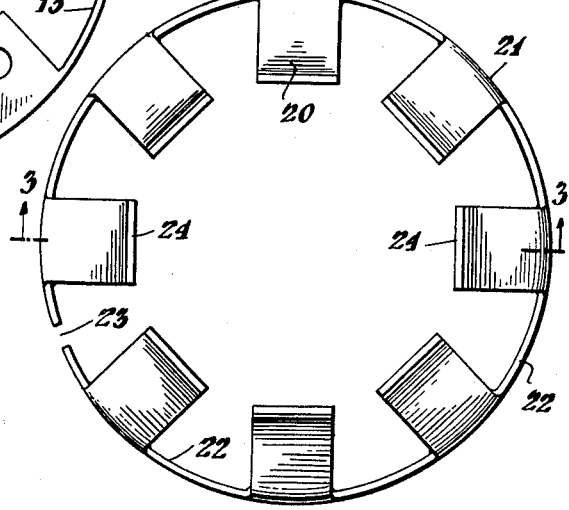
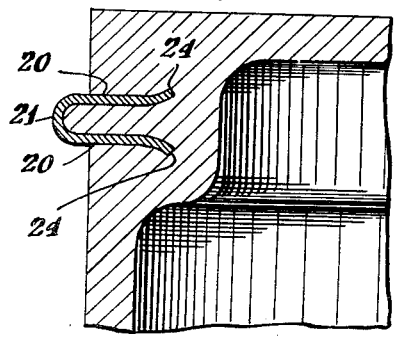
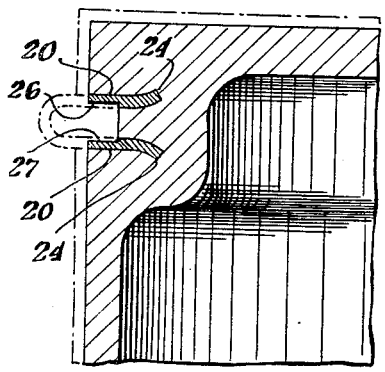
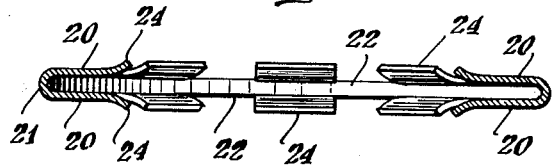
INVENTOR
Rudolph Daub
BY
ATTORNEY Oct. 18, 1960
R. DAUB
2,956,847
PISTON HEAD STRUCTURE
Original Filed June 14, 1954
4 Sheets-Sheet 2
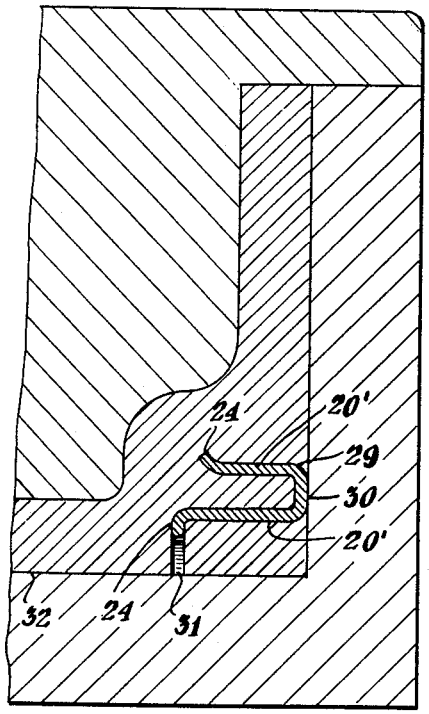
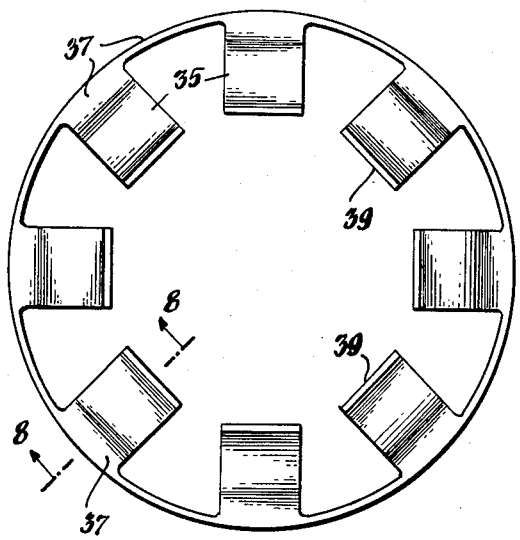
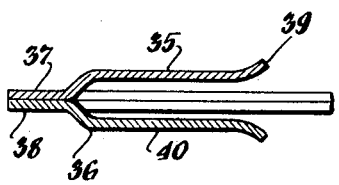
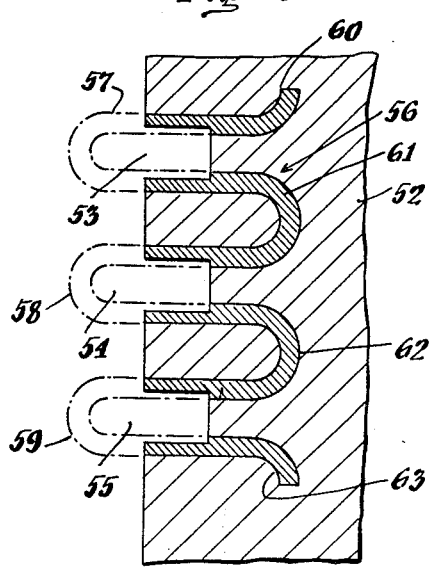
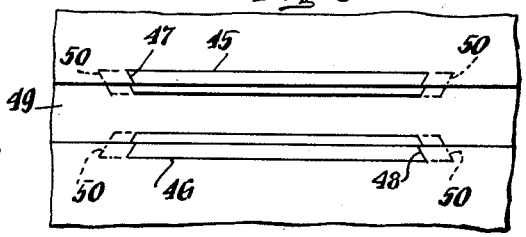
INVENTOR
Rudolph Daub
BY
ATTORNEY

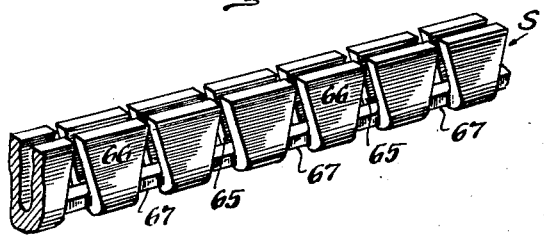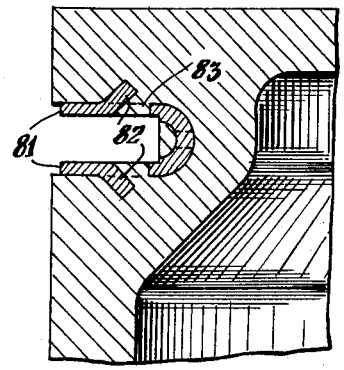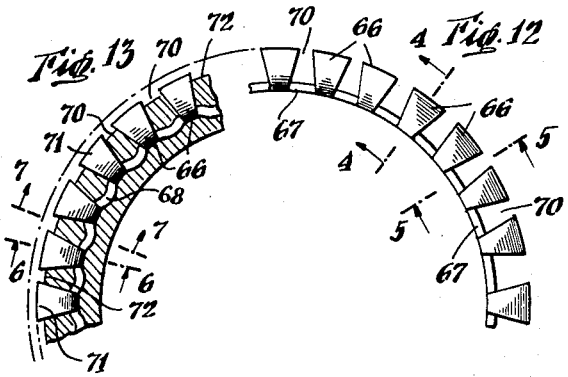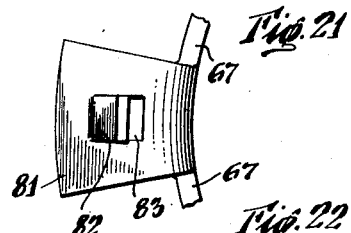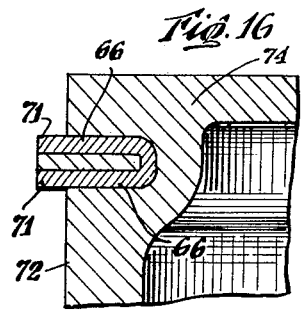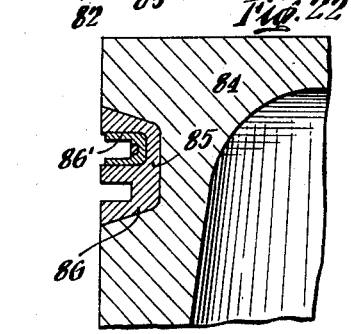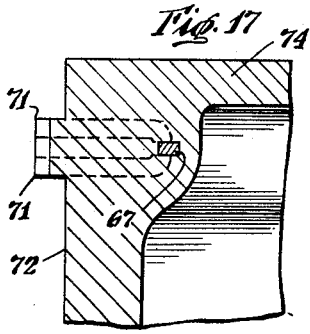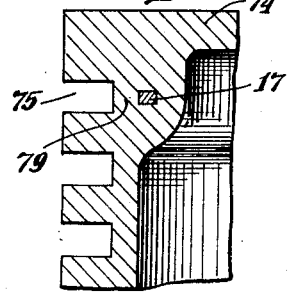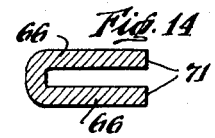

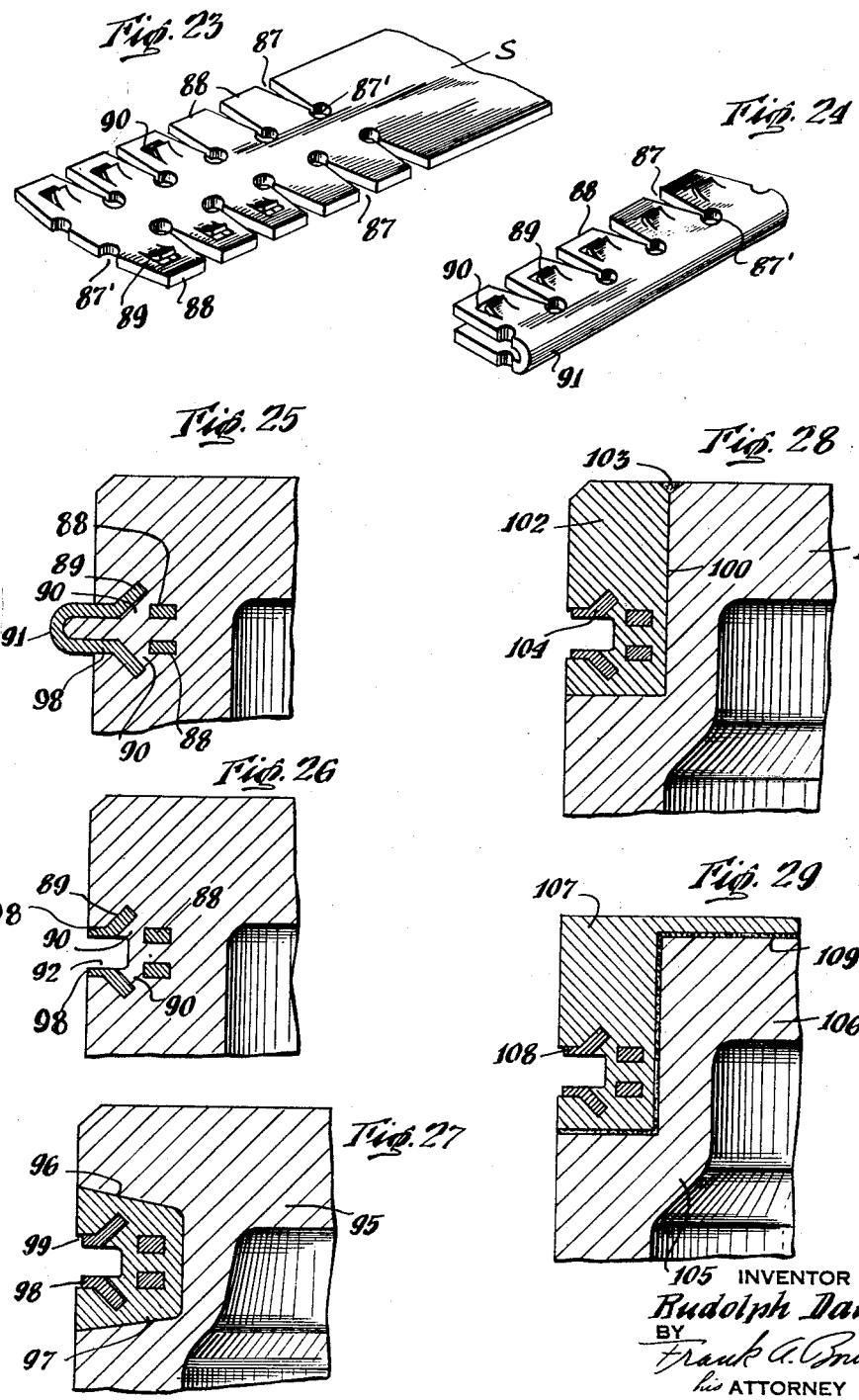

United States Patent Office 2,956,847
Patented Oct. 18, 1960

2,956,847

PISTON HEAD STRUCTURE

Rudolph Daub, 88 Hillside Ave., West Caldwell, N.J.

Original application June 14, 1954, Ser. No. 436,593, now Patent No. 2,776,176, dated Jan. 1, 1957. Divided and this application Dec. 24, 1956, Ser. No. 630,387

6 Claims. (Cl. 309—14)

This invention relates to piston structures and particularly to pistons for internal combustion engines and is a division of my application Serial No. 436,593, filed June 14, 1954, now issued as Patent No. 2,776,176.

The object of the invention is to provide a piston combining lightness and durability in service.

In light metal pistons the ring grooves and particularly the first groove at the piston head has a relatively short life due to the softness of the metal at the high temperatures encountered. Attempts to overcome this objection have involved composite structures, expensive and often complicated, and attended with their own additional difficulties such as the bonding of dissimilar metals under very severe stresses and extreme variations in temperature.

In the present piston structure these objections are overcome by combining with the groove structures of light metal facings of harder metal spaced apart around the groove and anchored in the light metal of the piston so as to present the hard metal for contact with the piston ring and individually distribute the resulting stresses throughout the soft to hard metal anchorages.

The hard metal inserts thus float in the soft metal and follow the expansion and contraction of the piston metal without developing substantial stresses between them and merely transmit and distribute the ring pressures to relatively large areas of the softer metal so as to reduce the intensity of the strains while taking up the wear of the ring action and protecting the softer metal of the groove.

A further object of the invention is to provide a piston having ring groove reinforcement which will be inexpensive and effective to take the wear and remain securely anchored in place throughout the life of the piston.

Further objects of the invention, particularly in the special die formation of a continuous metal strip into a connected series of reinforcing plates adapted to be embodied in the piston structure as a unit, will appear from the following specification taken in connection with the accompanying drawing, in which:

Fig. 1 is a plan view of a detail of the piston manufacture showing a series of sector pieces connected together in circular formation;

Fig. 2 is a plan view of a modification;

Fig. 3 is a sectional view taken along line 7—7 of Fig. 2;

Figs. 4 and 5 are sectional views of details of the piston using the modified insert of Figs. 6 and 7;

Fig. 6 is a partial view of the molding of a modified form of reinforcing insert;

Fig. 7 is a plan view of a further modified form of piston insert;

Fig. 8 is a sectional view taken on the line 12—12 of Fig. 7;

Fig. 9 is a face view of a modified hard metal insert in the piston body;

Fig. 10 is a radial sectional view of a detail illustrating a modified form of annular insert;

Fig. 11 is a perspective view of a series of reinforcing plates of a connected unit as die shaped from a continuous hard metal strip.

Fig. 12 is a plan view of a portion of a unit assembly of plates bent into arcuate formation and ready for casting in the light metal alloy of the piston.

Fig. 13 is a similar sectional view showing the connected plate structure after being cast in aluminum with consequent reduction in diameter and correspondingly distorted inner connecting ring portion.

Fig. 14 is a sectional view on line 4—4 of Fig. 12.

Fig. 15 is a similar view on line 5—5 of Fig. 12.

Fig. 16 is a sectional view on line 6—6 of Fig. 13.

Fig. 17 is a similar view on line 7—7 of Fig. 13.

Figs. 18 and 19 are sectional views corresponding respectively to Figs. 6 and 7 and showing the piston grooves as machined.

Fig. 20 is a radial sectional view on enlarged scale of a modified form of reinforcing plate.

Fig. 21 is a plan view of the plate shown in Fig. 10.

Fig. 22 is a radial sectional view of a further modified form of reinforcement.

Fig. 23 is a perspective view of the strip formation of a modification.

Fig. 24 is a similar view of the strip of Fig. 23 bent into doubled formation.

Fig. 25 is a cross section of strip of Fig. 24 curved into arcuate formation and cast in the light metal of a piston.

Fig. 26 is similar view after machining of the piston and insert.

Fig. 27 is a view similar to Fig. 25 but showing the application of the insert to forged light metal piston.

Figs. 28 and 29 are views similar to Fig. 27 and illustrating modified forms of the application of the insert to forged pistons.

In Fig. 1 the sectors 12 forming reinforcing inserts are connected by thin flexible strips 13 with an open gap 14 and sufficiently flexible to permit the sectors to move inward toward the center of the piston during cooling of the molten aluminum, the strip bending, as indicated in broken lines 15, or even breaking. During the subsequent machining operations the strip 13 will be removed and a piston ring groove formed in the piston with the sectors 12 forming wear resistant surfaces in the piston ring grove surfaces. The sectors 12 are anchored in place by alloy filling the orifices 16. Preferably the gap 14 will be provided and the overall dimension of the strip assembly may be such that it will fit snugly and under radial pressure into the mold in the manner of a sealing ring fitting a cylinder core (Fig. 6), thereby assuring a firm hold in the mold.

Instead of sectors 12 the reinforcing pieces may be provided (Figs. 2–5) as inward bent sections 20 of a sheet or plate metal strip 21 cut in flat form to provide the connecting strip portions 22 and then rolled to the desired diameter leaving gap 23. The sectors 20 have their inner ends 24 curved apart as shown and the ring is positioned in the mold to be cast with its peripheral strip portion 21 protruding, as shown in Fig. 8, so that the subsequent machining shown in broken lines (Fig. 5) will remove it and provide the surfaces 26, 27 of the ring groove while enclosing the ends 24 in the piston head.

In the modification shown in Fig. 6 a bent ring 29 of the type shown in Figs. 2–5 is sized to fit its outside diameter 30 within the mold which casts the piston metal with the crown at the bottom. Three of the sectors 20 have lugs or tongues 31 with their ends resting on the bottom 32 of the mold and positioning the ring as shown. After casting, the piston is machined to cut away the peripheral portions of the ring and provide grooving as illustrated in Fig. 5. The piston crown may be bored to a slight depth at each tongue 31 and plugged and smooth-surfaced to obliterate the markings. Another construction of a sheet or plate metal is illustrated in Figs. 7 and 8 made of two similar pieces 35, 36 fitted together at their peripheral rim portions 37, 38 and positioned together in the mold and cast and machined as described in connection with Figs. 2-5, giving a final structure corresponding to that shown in Fig. 9 with the sectors 39, 40 forming inserts in the opposite faces of the groove.

In Fig. 9 the hard metal inserts 45, 46 are illustrated with their edges 47, 48 cut at angles spreading to greater width within the seat in the metal on each side of the groove 49 so that they are retained against axial movement. Similarly these inserts are slightly tapered to less width at their outer ends from an intermediate point 50 so as to be retained against radial outward movement.

In the modification shown in Fig. 10, the piston body 52 has a plurality of ring grooves, for instance, 53, 54, 55 and the hard metal inserts are provided in a single assembly 56 forming annular rings 57, 58, and 59 carrying the four reinforcing pieces 60, 61, 62 and 63 extending inward as shown in Figs. 6 and 12, the outer portions being later cut away as indicated in broken lines to leave the inserts providing the grooved surfaces engaged by the rings.

The piston structure of this invention is inexpensive in manufacture and material and durable in service. It is light and strong and efficiently heat-dissipating to avoid excessive temperature rise and in particular to carry the heat away from the periphery of the piston near the crown. It thus avoids failure at the very most vulnerable area by presenting hard wearing surfaces in contact with the sealing ring and maintaining the continuity of the body metal structure between crown and wristpin bearings and at the same time providing uninterrupted paths for the flow of heat from the crown to the skirt.

All of these features contribute to the preservation of the bond between the sectors and the light metal body to render the structure permanently integral and insure proper fitting of the sealing ring throughout a long period of service.

In the modifications shown in Figs. 11 to 22 the flat hard metal strips are die-shaped on each side (Fig. 11) to cut out metal from a series of triangular spaces 65 leaving lines of V-shaped plates 66 bent into parallelism and connected by residual center pieces 67 into a unit which is curved into arcuate form with the connecting center pieces 67 on the inside with resultant widening of the spaces 65 to those shown at 70 in Figs. 12 and 13. The circular or arcuate units are placed in a mold and cast in place in the piston (Figs. 13, 16 and 17).

During the casting of the insert in the aluminum there is a slight expansion due to the heating and that is followed by a corresponding tendency to contract during cooling but the relative contraction of the aluminum alloy during cooling and after solidification of the aluminum will tend to shrink the insert circumferentially setting up compressive stresses in response to which the center pieces 67 may slightly bend for instance as emphasized at 68 (Fig. 13). To predetermine the direction of this shrinkage distortion and make it uniform all around the insert parts may be given an initial bend in the desired direction before casting.

As illustrated in Figs. 13, 16 and 17 the outer tip ends 71 of the plates 66 protrude beyond the periphery 71 of the rough casting 73 while the inner portions of the insert are deeply imbedded in the piston alloy.

In the subsequent finish machining of the piston 74 and formation of the groove 75 (Figs. 18 and 19) the outer ends of the plates 66 are cut away to new surfaces 76, 77 and 78 corresponding to the desired grooving and adapted to receive the piston ring wear and greatly extend the life of the piston.

The plates 66 thus provide a hard metal surface for the piston ring groove 75 and are locked in place by the center pieces and the cast light metal 79 between the center pieces and the groove (Figs. 18 and 19).

In the form shown in Figs. 20 and 21 the plates 81 do not reach to the periphery of the finally machined piston and they are provided with protruding tongues or barbs 82 struck up out of the metal during the die shaping leaving the openings 83 to be filled with the cast metal as shown (Fig. 20).

In Fig. 22 the reinforcing inserts are shown applied to a forged piston 84, the peripheral groove 85 being formed by forging and having the cast ring 86 containing the hard metal inserts 86' as explained in connection with the earlier figures (Figs. 1 to 10), the strip (Fig. 24) being curved into arcuate form with the bend 91 on the outside (Fig. 25) to be machined off in the finishing operations (Fig. 26).

In Figs. 23 through 27 the strip is bent to form radially parallel upper and lower inserts 98 with annular projections 89 punched from the metal to form orifices which are filled with the metal of the piston head to form plugs 90. The projections 89 have sloped surfaces facing the piston ring groove and the plugs 90 fit between the sloped surfaces and the projections 89 to axially lock the inserts in position. The insert has an inner piece 88 for radially locking the inserts in the metal. The strip has notches 87' on each side of the insert to provide a uniform or circular piece. These notches are machined off with the bend 91. On machining of the piston, the inserts form piston wear groove surfaces 92.

In a forged piston such as 95 of Fig. 27 the groove 96 is peripherally formed and in this is cast the light metal ring 97 containing the inserts 98 cast in place as previously described (Figs. 23-26) having its outermost periphery reduced in finishing to provide the clearance 99 within the full diameter of the piston 95.

In the structure of Fig. 28 the forged annular recess at the top of piston 101 has the ring casting 102 fitted in place and secured by welding at 103. It carries cast within it the inserts 104 similar to inserts 98 of Fig. 27. Preferably the final finishing and grooving of the piston is after the positioning of the ring 102 carrying the connected inserts 104.

The forged piston 105 of Fig. 29 has its top 106 carrying the crown casting 107 of light metal carrying the hard metal inserts 108, the casting 107 being fastened by brazing 109.

The groove armoring inserts of this invention are thus readily embodied in light metal pistons cast or forged and serve at slight cost to greatly prolong the life of the engine in avoiding deterioration and failure of the sealing means.

As indicated in the drawings the groove surfacing is particularly important in the first groove nearest the highly heated piston head. At the same time the reinforcements present negligibly small resistance to the passing of the heat energy and the cooling of the piston head.

I claim:

1. A piston structure comprising a piston head of cast metal, a generally rectangular groove in said head for the accommodation of a sealing ring and having a flat upper surface, flat hard metal inserts embedded in said piston head and circumferentially arranged in a radial plane in closely spaced relation, each insert having a flat surface to form circumferentially spaced hard metal surfaces in said upper surface in close relation with intervening metal surfaces of the piston head between said hard metal surfaces to form a continuous sealing surface, said insert having an opening formed therein with a prong extending at an angle to said metal towards the center of the piston to form an inclined surface facing said groove, said piston head having a cast metal plug fitting in said opening having an end surface contiguous with said hard metal surface forming a portion of said continuous sealing surface, said plug radially locking said insert in place and having a wedged-shaped portion between said inclined surface and the sealing surface to axially lock the inserts and being hammered by a sealing ring to maintain the lock during extended use.

2. A piston structure as set forth in claim 1 in which said opening and prong are rectangular in shape.

3. A piston structure as set forth in claim 1 in which said piston head has a lower surface with circumferentially spaced metal inserts paired with a respective upper plate, said plates having an interconnecting member connected to each set of paired plates to anchor said plates in the piston head.

4. A piston structure as set forth in claim 3 in which said interconnecting members are linked by intermediate pieces.

5. A piston structure as set forth in claim 1 in which said metal plates have an outer circumferential edge radially spaced inwardly from the cylindrical wall of the piston.

6. A piston structure comprising a piston head of cast metal, a generally rectangular groove in said head for the accommodation of a sealing ring and having a flat upper surface, flat hard metal inserts embedded in said piston head and circumferentially arranged in a radial plane in closely spaced relation, each insert having a flat surface to form circumferentially spaced hard metal surfaces in said upper surface in close relation with intervening metal surfaces of the piston head between said hard metal surfaces to form a continuous sealing surface, said insert having an opening formed therein having an inclined surface facing said groove, said piston head having a cast metal plug fitting in said opening having an end surface contiguous with said hard metal surface forming a portion of said continuous sealing surface said plug radially locking said insert in place and having a wedged shaped portion between said inclined surface and the sealing surface to axially lock the inserts and being hammered by the sealing ring to maintain the lock during extended use.

References Cited in the file of this patent

Automotive Industries, July 1, 1956, page 133.